(12) United States Patent
Auburn et al.

(10) Patent No.: US 9,304,826 B2
(45) Date of Patent: Apr. 5, 2016

(54) SYSTEM AND METHOD FOR IMPROVED DYNAMIC ALLOCATION OF APPLICATION RESOURCES

(75) Inventors: RJ Auburn, Orlando, FL (US); Harm-Jan Spier, Orlando, FL (US); Jose M. de Castro, Orlando, FL (US); Daniel Aloyse Polfer, Maitland, FL (US); Alexander S. Agranovsky, Longwood, FL (US); Robbie A. Green, Apopka, FL (US)

(73) Assignee: Aspect Software Inc., Chelmsford, MA (US)

( * ) Notice: Subject to any disclaimer, the term of this patent is extended or adjusted under 35 U.S.C. 154(b) by 1379 days.

(21) Appl. No.: 12/861,351

(22) Filed: Aug. 23, 2010

(65) Prior Publication Data

US 2011/0046956 A1 Feb. 24, 2011

Related U.S. Application Data

(60) Provisional application No. 61/236,125, filed on Aug. 23, 2009.

(51) Int. Cl.
*G06F 15/173* (2006.01)
*G06F 9/50* (2006.01)
*H04M 3/493* (2006.01)
*H04L 29/06* (2006.01)
*G10L 13/00* (2006.01)
*G10L 15/26* (2006.01)
*H04M 7/00* (2006.01)

(52) U.S. Cl.
CPC .............. *G06F 9/5055* (2013.01); *G10L 13/00* (2013.01); *G10L 15/26* (2013.01); *H04L 65/1006* (2013.01); *H04M 3/4938* (2013.01); *H04M 7/006* (2013.01); *H04M 2201/39* (2013.01); *H04M 2201/40* (2013.01)

(58) Field of Classification Search
None
See application file for complete search history.

(56) References Cited

U.S. PATENT DOCUMENTS

| | | | |
|---|---|---|---|
| 6,314,465 B1 * | 11/2001 | Paul et al. | 709/226 |
| 7,496,054 B2 | 2/2009 | Taylor | |
| 8,073,940 B1 * | 12/2011 | Richardson et al. | 709/223 |
| 2001/0038689 A1 * | 11/2001 | Liljestrand et al. | 379/201.03 |
| 2002/0194010 A1 * | 12/2002 | Bergler et al. | 705/1 |
| 2004/0267930 A1 * | 12/2004 | Giulio et al. | 709/225 |
| 2005/0240659 A1 * | 10/2005 | Taylor | 709/217 |
| 2009/0052437 A1 | 2/2009 | Taylor et al. | |

* cited by examiner

*Primary Examiner* — Mohamed Wasel
*Assistant Examiner* — Tsung Wu
(74) *Attorney, Agent, or Firm* — Husch Blackwell LLP

(57) ABSTRACT

A self-help application platform such as one hosting an interactive voice response (IVR) has a browser that executes application scripts to implement the self-help application. The execution of the application scripts is performed by utilizing various application resources, such as media conversions from text to speech (TTS) and speech to text (automatic speech recognition ASR) and other media servers. The platform is provided with a dynamic resource selection mechanism in which the application is executed with an updated optimum set of application resources distributed over different locations. The selection is based on the profiles of the browser, users, route, and quality of service. The selection is further modulated by the browser's previous experiences with the individual resources. The selection is made dynamically during the executing of the application script.

28 Claims, 8 Drawing Sheets

Application Environment

Static & Localized Application Resource Routing (PRIOR ART)

Dynamic & Distributed Application Resource Provisioning

SYSTEM AND METHOD FOR IMPROVED DYNAMIC ALLOCATION OF APPLICATION RESOURCES

CROSS-REFERENCE TO RELATED APPLICATION

The benefit is claimed of U.S. provisional patent application of R J Auburn, Harm-Jan Spier, Jose M. De Castro, Daniel Aloyse Polfer, Alex S. Agranovsky and Robbie A. Green, Application No. 61/236,125 filed on Aug. 23, 2009.

FIELD OF THE INVENTION

The present invention relates to telecommunication and networked computer and computer telephony systems including the Internet and the Public Switched Telephone System, and more particularly to an interactive self-help application platform utilizing an optimum set of distributed resources needed during executing of the self-help application.

BACKGROUND OF THE INVENTION

A platform for hosting voice applications is realized by a collection of voice application scripts, browsers and resources. A useful class of voice applications is interactive voice response ("IVR"). IVR is a technology that automates interaction with telephone callers. Enterprises are increasingly turning to IVR to reduce the cost of common sales, service, collections, inquiry and support calls to and from their company.

IVR is one example of what is generally referred to as a self-help application. In the voice context, a self-help application is referred to as IVR.

Historically, IVR solutions have used pre-recorded voice prompts and menus to present information and options to callers, and touch-tone telephone keypad entry to gather responses. Modern IVR solutions also enable input and responses to be gathered via spoken words with voice recognition.

IVR solutions enable users to retrieve information including bank balances, flight schedules, product details, order status, movie show times, and more from any telephone. Additionally, IVR solutions are increasingly used to place outbound calls to deliver or gather information for appointments, past due bills, and other time critical events and activities.

U.S. Pat. No. 7,496,054 discloses telephony platform for hosting voice applications. The entire disclosure of U.S. Pat. No. 7,496,054 is incorporated herein by reference. In such a platform, a voice application is selected by a dialed number and executed by a browser while employing selected application resources. Examples of resources include ASR (Automatic Speech Recognition), TTS (Text to Speech), media servers, proxy servers, etc.

Prior art systems typically either have the selection of the application resources predefined or necessarily based on the availability of the resource in question. The predefined selection often amounts to simply selecting a given physical service center, with a preconfigured, localized set of browsers and resources. For example, IVR servers traditionally have their resources (such as ASR, TTS, media, or proxy servers) configured in static configuration sources such as xml files or other such media with very limited support for dynamic selection of resources.

Thus, it is desirable to have a self-help application platform free from the above-mentioned limitations.

SUMMARY AND OBJECTS OF THE INVENTION

A self-help application platform such as one hosting an interactive voice response (IVR) has a browser that executes an application script to implement the self-help application. The execution of the application script is performed by utilizing various application resources, such as media conversions from text to speech (TTS) and speech to text (automatic speech recognition ASR) and other media servers. The platform is provided with a dynamic resource selection mechanism in which the application is executed with an updated optimum set of application resources distributed over different locations. The selection is based on the profiles of the browser, users, route, and quality of service. The selection is further modulated by the browser's previous experiences with the individual resources. The selection is made dynamically during the executing of the application script.

The present invention provides improved flexibility and sophistication for selection of resources for a given browser. The selection is based on additional resource selection criteria, including central-view/local-view of resource status, calling party, called party, current tenant in a multi-tenant system, and also resource preference. A multi-tenant system has multiple users/customers sharing the same hosting platform.

The invention described allows an optimum selection of a resource when a user/customer's application is being executed in a browser. The selection takes into account of predefined user preferences and license limitations, performance considerations, and resource availability. The maintenance of a local list which serves as a blacklist of resources relative to the browser/customer/application based on history provides refined selections of resources. Also, the license limitation is imposed at a peer to peer level, between the browser/customer/application and the resource in question, rather than being enforced by a centralized control. This distributed approach avoids the disadvantage of a single point of failure.

Additional objects, features and advantages of the present invention will be understood from the following description of its preferred embodiments, which description should be taken in conjunction with the accompanying drawings.

DESCRIPTION OF THE PREFERRED EMBODIMENTS

Figure 1:
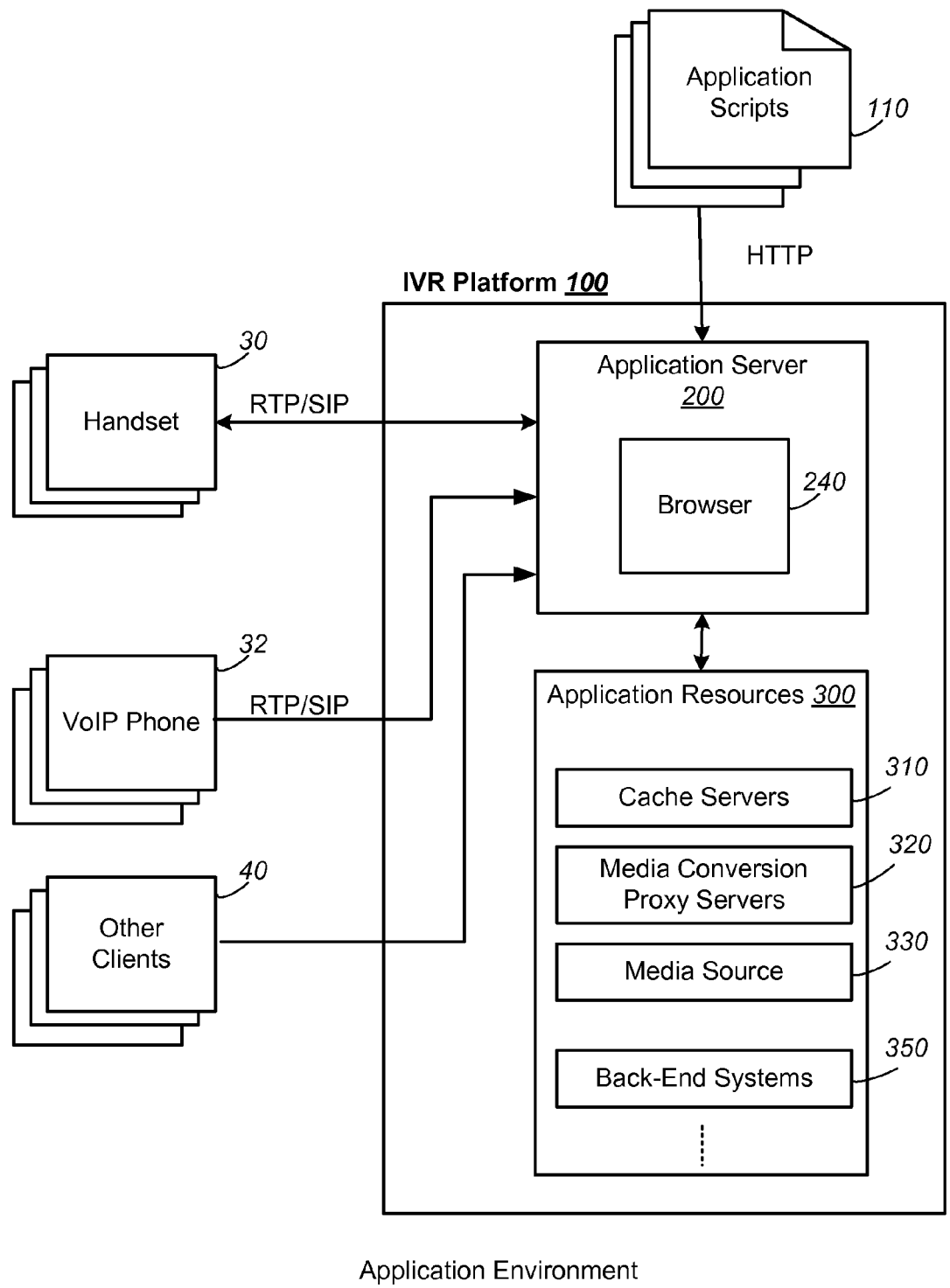
FIG. 1 illustrates an example of a self-help application environment in which an interactive voice response (IVR) is deployed.

FIG. 1 illustrates an example of a self-help application environment in which an interactive voice response (IVR) is deployed. When a user makes a call through a voice client such as a handset 30 or a VoIP phone 32 to the IVR 100, the voice application script 110 associated with the call number is retrieved. Other clients 40 may also interact with the application. The platform includes an application server 200 that implements a browser 230. The browser 240 executes or renders the retrieved voice application script 110 to allow the user to interact with the voice application. Such a voice application is specified by a voice application script with codes having voice-specific statements. Typically such voice-specific statements can include VoiceXML tags or other dialog specific tags.

U.S. Patent Application Publication No. US-2009-0052437-A1 discloses a similar IVR system and the entire disclosure of which is incorporated herein by reference.

The retrieved voice application script 110 is executed and rendered by the browser 240 by utilizing various application resources 300. For example, the application resources include cache servers 310, media conversion proxy servers 320, media source 330 and back-end systems 350.

Traditionally, the application resources 300 are co-located with the application server 200 for reliable access and maintenance. Also the application resources are typically statically preconfigured and hard-coded in the application script.

Figure 2:
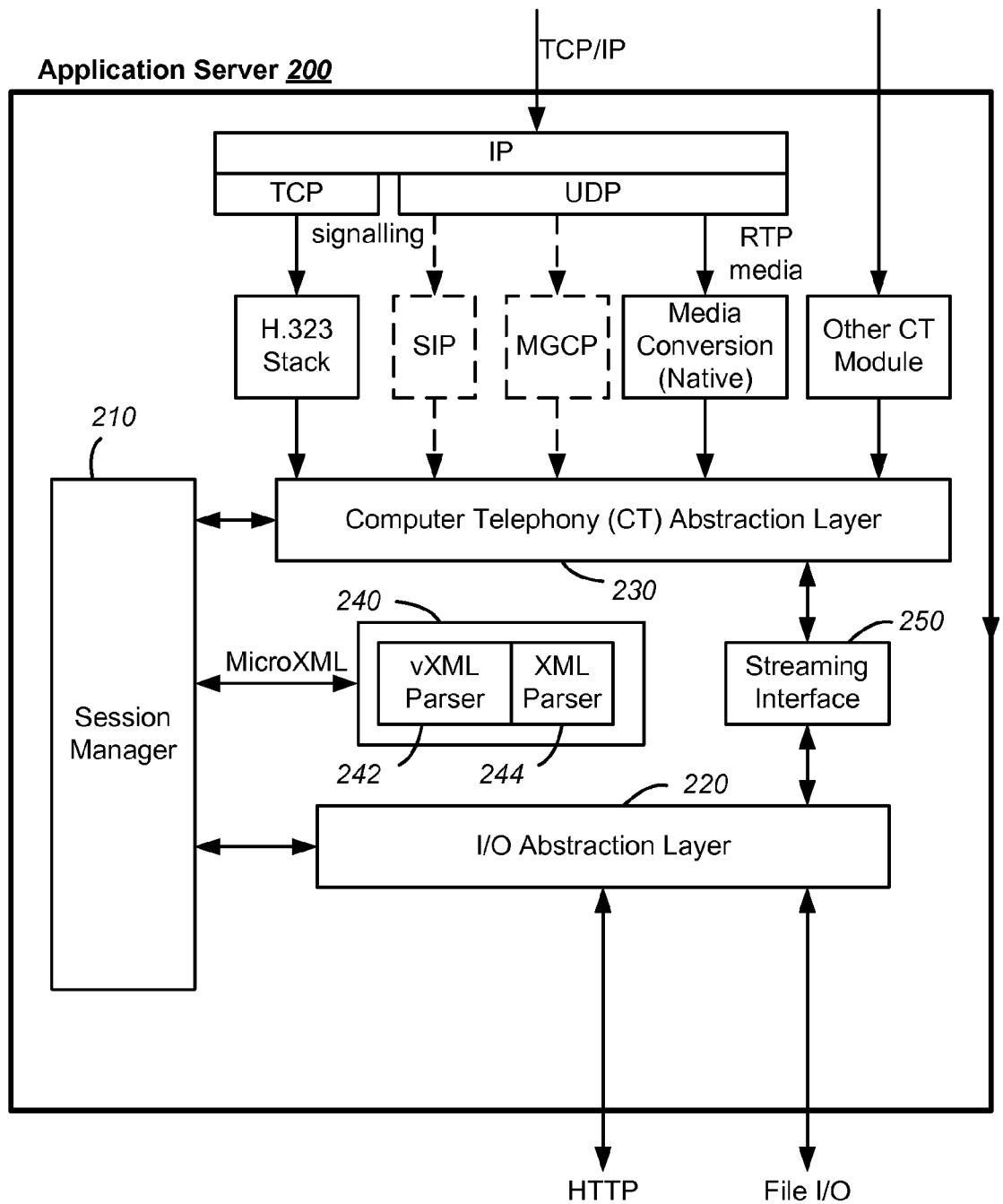
FIG. 2 is a detailed block diagram of the application server shown in FIG. 1.

FIG. 2 is a detailed block diagram of the application server shown in FIG. 1. The application server 200 is responsible for accepting incoming calls, retrieving the application scripts 110 associated with the dialed number and executing the vXML scripts of the application scripts 110. Each incoming voice is treated as a separate session and the application server 200 is responsible for processing all user events and system actions that occur in multiple simultaneous sessions. The application server is also responsible for all voice routing in all sessions.

In the preferred embodiment, the application server 200 is a set software modules running on a Windows or UNIX server. For example, the application server 200 is implemented as a Windows machine on a card, and multiple cards are installed on a caged backplane to form a high scalable system.

The application server 200 comprises four main software modules, a session manager 210, an I/O abstraction layer 220, computer telephony (CT) abstraction layer 230, and a telephony scripting language parser 240. The telephony scripting language parser 240 further comprises a telephony XML or vXML parser 242 and a generic XML parser 244. In addition, a streaming interface 250 provides a direct streaming path for media data between the I/O abstraction layer 220 and the CT abstraction layer. Each of these modules is designed to be a separate DLL and perform a specific task. In the preferred embodiment, the AGS is a console only application with no user interface for any of these modules. Several of these modules incorporate commercial, third party software components in performing their tasks. These components will be discussed along with the appropriate modules.

The session manager 210 is the centerpiece of the application server 200. It is responsible for creating new sessions, deleting terminated sessions, routing all actions and events to the appropriate modules and maintaining modularity between each session. It responds to I/O and vXML goto requests, and other additional events. In one embodiment, it employs commercially available software libraries containing thread and string classes.

The session manager interfaces to the external of the application server via the I/O abstraction layer 220 and the CT abstraction layer 230. It accesses the I/O and CT layers as a set of classes and member functions that are individual DLLs. The Session Manager 210 runs as a single-threaded processor of actions and event.

FIG. 2 also illustrates the manner in which the modules of the application server communicate with each other. The session manager communicates to both the I/O abstraction layer and the CT abstraction layer through traditional DLL entry points with C/C++ parameter passing. The I/O abstraction layer and the CT abstraction layer communicate through a streaming interface. The session manager and the telephony scripting language parser communicate through DLL entry points using microXML. The session manager 210 behaves like a virtual machine with its own set of "OpCodes". MicroXML is the parsed vXML scripts interpreted into these OpCodes.

Figure 3:
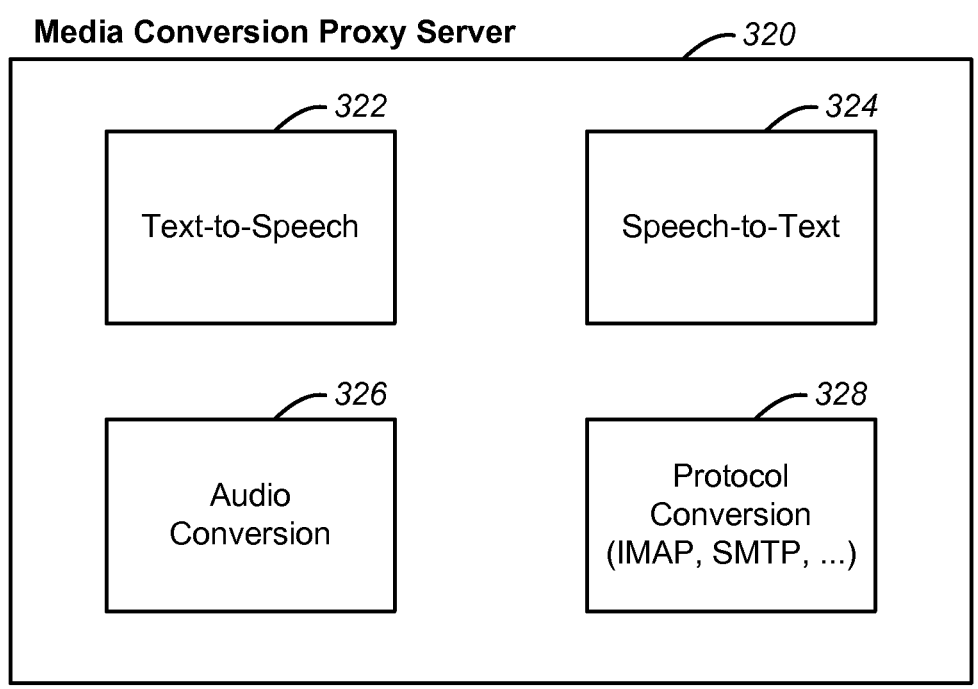
FIG. 3 is a block diagram illustrating schematically some of the components of the media conversion proxy server.

FIG. 3 is a block diagram illustrating schematically some of the components of the media conversion proxy server. The media conversion proxy server 320 comprises a text-to-speech (TTS) module 322, a speech-to-text (ARS) module 324, an audio conversion module 326 and a protocol conversion module 328. The modular design allows for other "plug-ins" as the need arises. The text-to-speech (TTS) module 322 is used for converting text to synthesized speech. For example, this is useful for reading back e-mail messages. The speech-to-text (also known as automatic speech recognition ASR) module 324 is used for converting speech to text. This is useful in speech recognition applications involving responding to a user's voice response. The audio conversion module 326 converts between a supported set of audio formats, such as G.711, G.723, CD audio, MP3. The protocol conversion module 328 allows conversions between protocols such as IMAP (Internet Message Access Protocol) and SMTP (Simple Mail Transfer Protocol).

In a multi-language environment, the platform will need to support multiple languages. For example, for a multi-national enterprise, the platform not only may have to support multiple languages, but the same language in multiple accents, such as American English, British English, Indian-accented English, etc. The ARS and TTS modules will have to be tuned specifically to each of these languages and accents.

Figure 4:
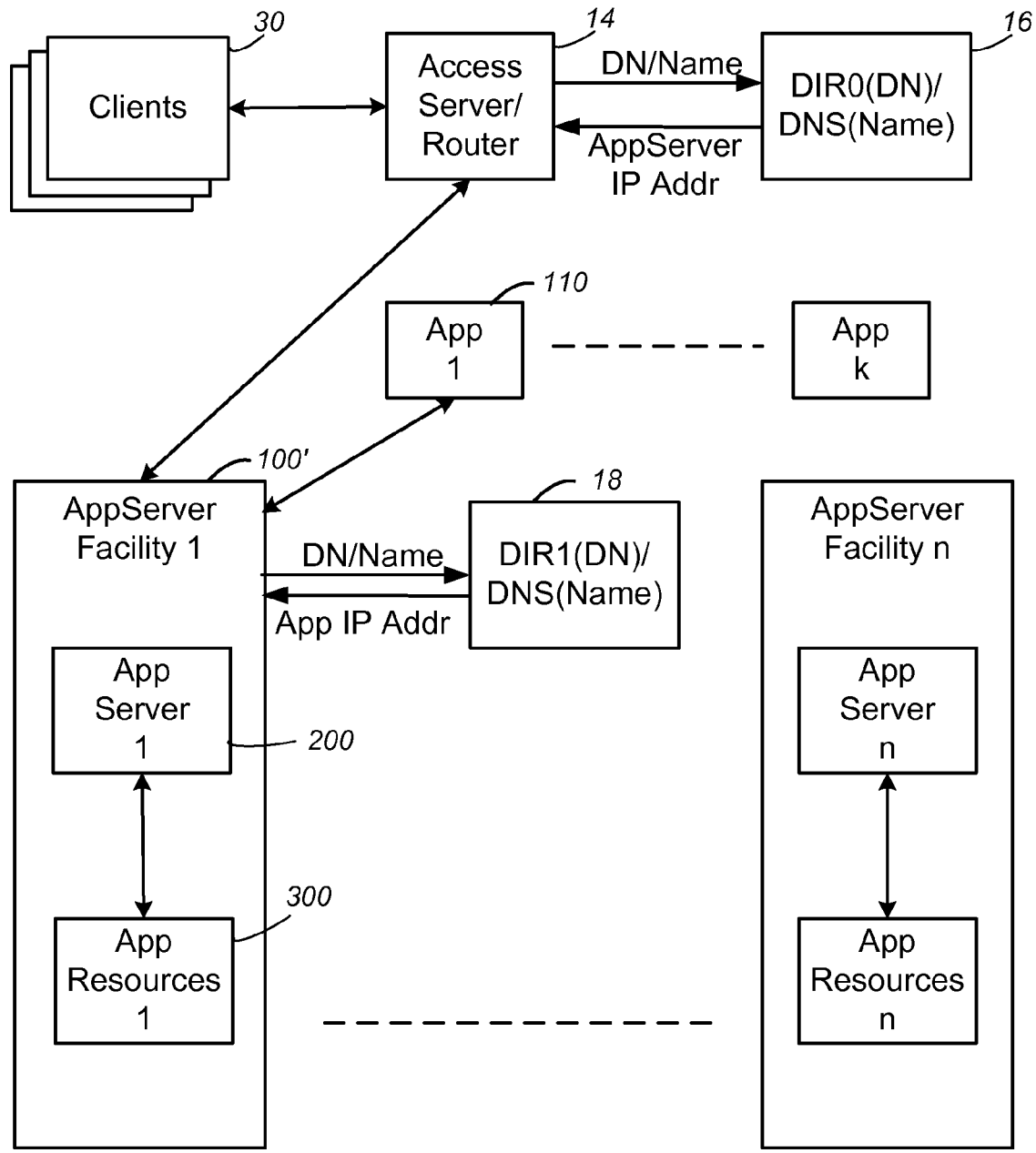
FIG. 4 illustrates schematically the manner a conventional IVR operates, particularly with regard to utilization of a static and localized set of application resources.

FIG. 4 illustrates schematically the manner a conventional IVR operates, particularly with regard to utilization of a static and localized set of application resources. A set of designated voice numbers handled by the IVR is registered in a directory, such as DIR0 16. When a voice client 30 calls one of the designated voice numbers from the telephone network PSTN (not shown explicitly), it is switched to an access server 12 on the Internet. The access server 12 performs a lookup of the dialed number (DN) in the directory DIR0 16 and obtains the IP address of the application server 200 located in an application server facility 100'. It this example, the call is then routed to the application server 200 for processing. Similarly, if the voice originates from one of the terminal equipment on the Internet, a directory lookup of DIR0 provides the pointer for routing the voice to the application server 200. In another embodiment, where the IVR is replaced by a self-help application similar to a webbot, the access server 14 acts like a router and the DIR0 acts like a DNS looking up the IP address of the application server 200.

Once the client is directed to the application server 200, the application server queries a directory DIR1 18 for the IP address of the application script associated with the dialed number (DN). Each application is specified by an application script coded in vXML and is being hosted as a webpage on a web server on the Internet. The application server 200 retrieves the vXML webpage and executes the call according to the application script.

As described earlier, the retrieved application script 110 is executed and rendered by the browser 240 (see FIG. 1) in the application server 200 by utilizing various application resources 300. These application resources 300 are typically co-located with the application server 200 in the application server facility 100' for reliable access and maintenance as well as for economic and security considerations. Even if some of the resources accessed are outside the application server facility, their selections are predetermined and static, with their addresses hard-coded in the application scripts.

Figure 5:
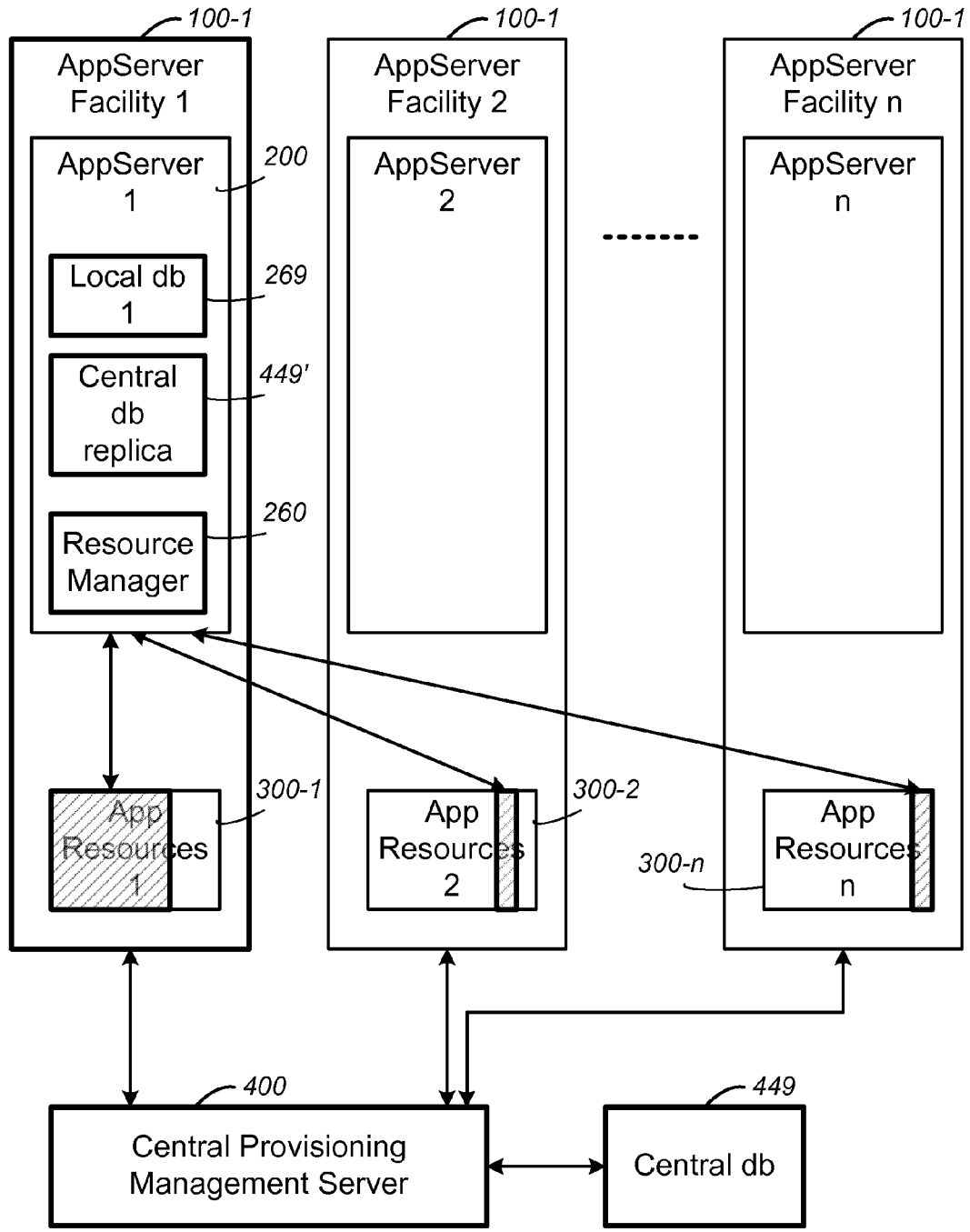
FIG. 5 illustrates schematically an application server utilizing a set of application resources that are distributed and selected dynamically, according to a general embodiment of the invention.

FIG. 5 illustrates schematically an application server utilizing a set of application resources that are distributed and selected dynamically, according to a general embodiment of the invention. Compared to that of FIG. 4, the application server 200 does not utilize a static set of application resources like application resources 300-1. Instead, it utilizes a dynamic set of application resources typically distributed over different application server facilities such as 100-1, 100-2 and 100-n.

After the application server 200 has retrieved the application script associated with the dialed number (DN) (see FIG. 4), the application server 200 proceeds to execute and render the application script. As the application script is being executed, various application resources are needed and their addresses are provided dynamically by a resource manager 260, preferably implemented in the application server.

The example in FIG. 5 illustrates that the resources needed by the application as provided dynamically are distributed all over the IP network, with most of the resources 300-1 located locally at the same application facility 100-1 hosting the application server 200, but also with some of the resources 300-2 and 300-n located in other application facilities, such as facilities 100-2 and 100-n respectively.

The resource manager 260 essentially operates with two set of information, provided respectively by a central database 449' and a local database 269, to come up with a list of resources for the application.

The application server 200 normally maintains a history of its experiences with previous resources it has dealt with in a local database 269. The previously engaged resources and their quality of service are logged in the local database 269.

A central provisioning management server 400 on the IP network is responsible for maintaining a central database 449 of all resources available on the IP network. It communicates with the resources periodically to check on the status of the individual resources and to update the information in the central database 449. The central provisioning management server is generally located at a different network node from that of a typical application server. A copy of the central database 449 is replicated to each of the application servers 200-1, 200-2, . . . , 200-n periodically. In this way, each of the application servers, such as the application server 200 has a local replica 449' of the central database 449.

Figure 6:
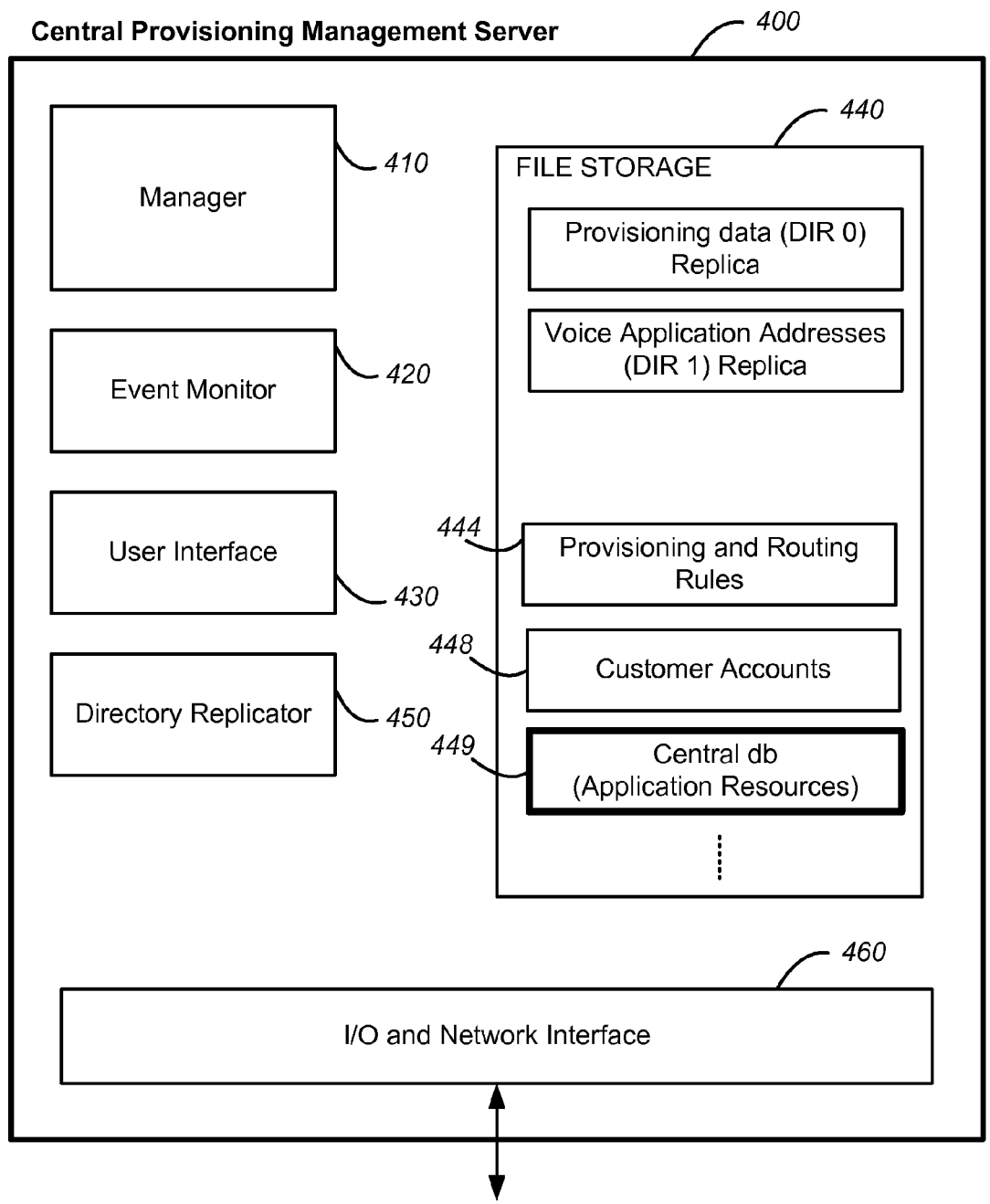
FIG. 6 is a functional block diagram of the central provisioning management server.

FIG. 6 is a functional block diagram of the central provisioning management server. The server 400 comprises a manager 410 for managing the operations, an event monitor 420, a user interface 430, a directory replicator 450, a file storage 440 and an I/O and network interface 460. The file storage 440 stores various provisioning directory including DIR0 16 and DIR1 18 (see FIG. 4), a set of predefined provisioning and routing rules 444, and customer accounts 448. It also stores the central database 449.

In operation, the manager 410 manages user access and responds to the event monitor 420 to initiate various operations. Through the user interface a user can add, modify or delete data in the various databases. As described earlier, the central provisioning management server 400 checks on the status of al the registered resources on the IP network and updates the information in the central database 449. Thus it will collect the status of each resource at predefined times and maintain the status information in the central database 449 of resources. For example, the status report from each resource includes its performance with metrics such as how busy the resource is or what capacity remains at the time. The central database 449 will also contain the network address of each resource. The directory replicator periodically replicates the central database 449 to the individual applications servers.

Figure 7:
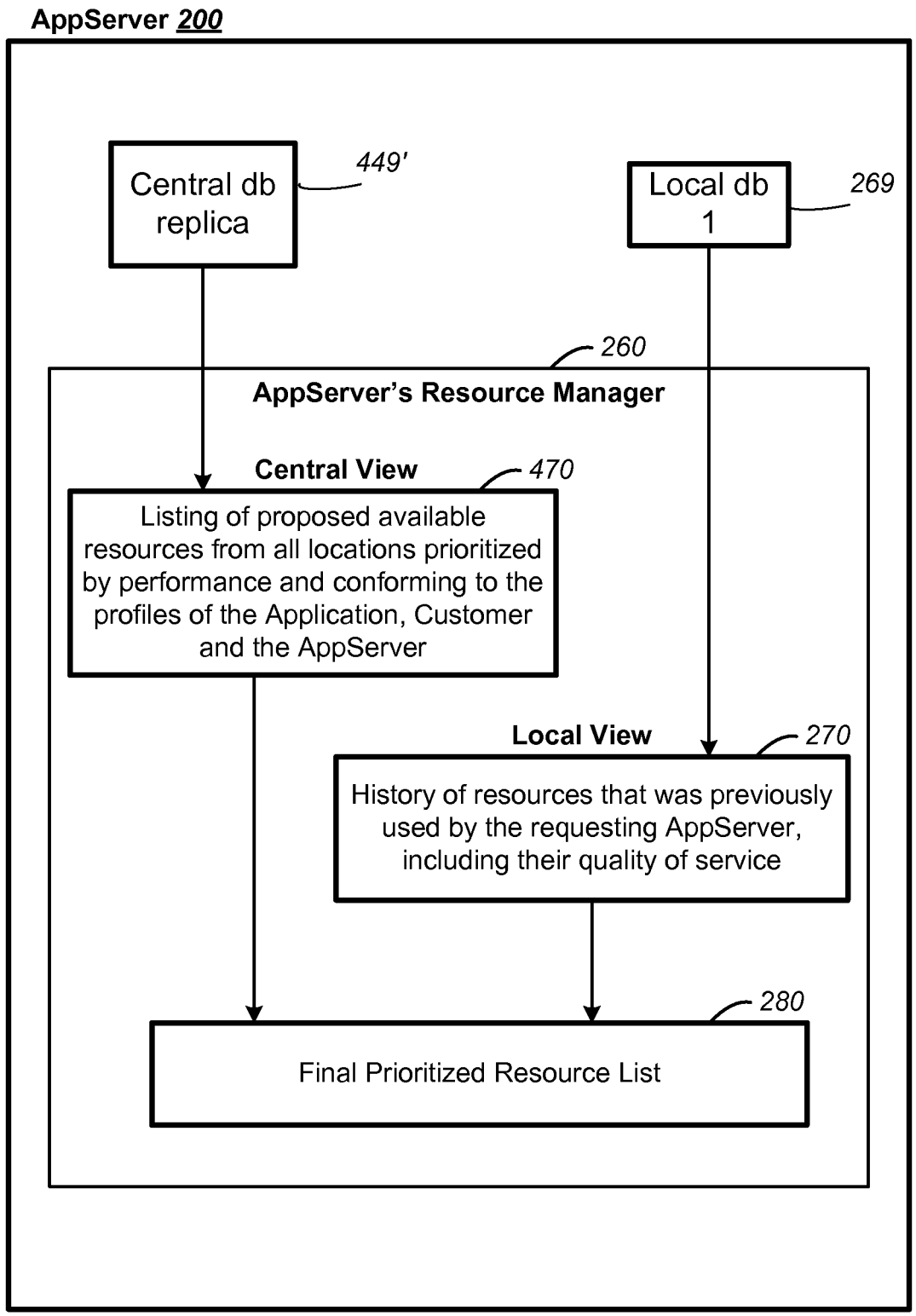
FIG. 7 illustrates the resource manager providing a list of resources to the application server based on information from the central and local databases.

FIG. 7 illustrates the resource manager providing a list of resources to the application server based on information from the central and local databases. The dialed number (DN) essentially provides an ID for the customer and the application. The information of the customer and the associated application is maintained in the customer accounts 448 in the central database 449'. Typically, the application is preconfigured to be supported by a class of application servers distributed among predefined community of such application servers.

Resource preferences are typically defined by performance considerations and customer profiles. For example, performance considerations may include a local resource over a remote one, or a more powerful server providing the resource in question. A customer profile expresses user needs and preferences, which is also formalized in a customer contract. For example, a customer's need is for a particular type foreign language ASR. A predefined customer contract may express the customer's preference due to cost and performance at any given time of usage. Using this model allows an application to simply request that it needs a speech recognition resource that supports US English and the platform will then select the best match for the service based on operator preferences and current resource usage.

The resource preference and resource availability are both incorporated into the central database 449 of resources. When a browser 240 needs to work with a resource, it will delegate to the resource manager 260 to query the central database 449' by resource type. Conforming to the profiles of the application, the customer and the selected application server, the resource manager 260 queries the central database 449' to generate a list of application resources prioritized by performance. This list will be referred to as a "central view" 470.

The central-view query returns a dynamic list of specific resources of the type. The central-view list 470 is sorted in order of preferable selection based on preference and availability. While the central view 470 factors in the performance of the individual application resources, it is from the network viewpoint of the central provisioning management server 400 relative to the individual application resources. Since the application server 400 is accessing these application resources from a different location on the network, it is desirable to make the central view 470 more application server-centric. This is accomplished by consideration of the local database 269 as well.

The resource manager 260 queries the local database to return a list of previously contacted resources prioritized by availability. This list will be referred to as a "local view" 270. The local view 270 indicates how successful the browser's attempt with each resource has been. Preferably, the local view differentiates an unsuccessful use by failure type and orders with a metric accordingly, such as the degree of failure or network access rate. Failure types in order of severity include resource name not found, timeout in reading data, and busy for various reasons.

For example, one type of the resource being busy is due to the user's license being exceeded. A resource being solicited by a browser running a customer's application is cognitive of the limits set forth in the user/customer's license. This information may, for example, be kept and obtainable in the central database. When the browser/application tries to connect to the resource, the resource will accept or reject the connection based whether the browser/application's limits have been exceeded. Thus, the local view could be regarded as a prioritized "black list" of resources, indicating the degree of failure or success in a previous attempt to connect to individual resources.

When the browser of the application server 200 is selecting a resource, it will be based on both the central view 470 as well as the local view 270. For example, the central view returns a list of resources of the same type. The local view is used to further filter the central-view list. In this way an optimum resource failover list in the form of a final prioritized list 280 can be maintained and consulted when selecting a resource by the browser of the application server.

Thus, the local-view list 270 is used to further filter the central-view list 470 to obtain the final prioritized list 280. The browser selects the specific resource at the top of the final prioritized list 280. If that selected resource turns out to be unavailable for whatever reasons, the next one on the list 280 is selected, and so on. Load balancing is also considered when several specific resources of a given type are of equal order. In which case a round robin scheme of selection is used to select one among them.

Figure 8:
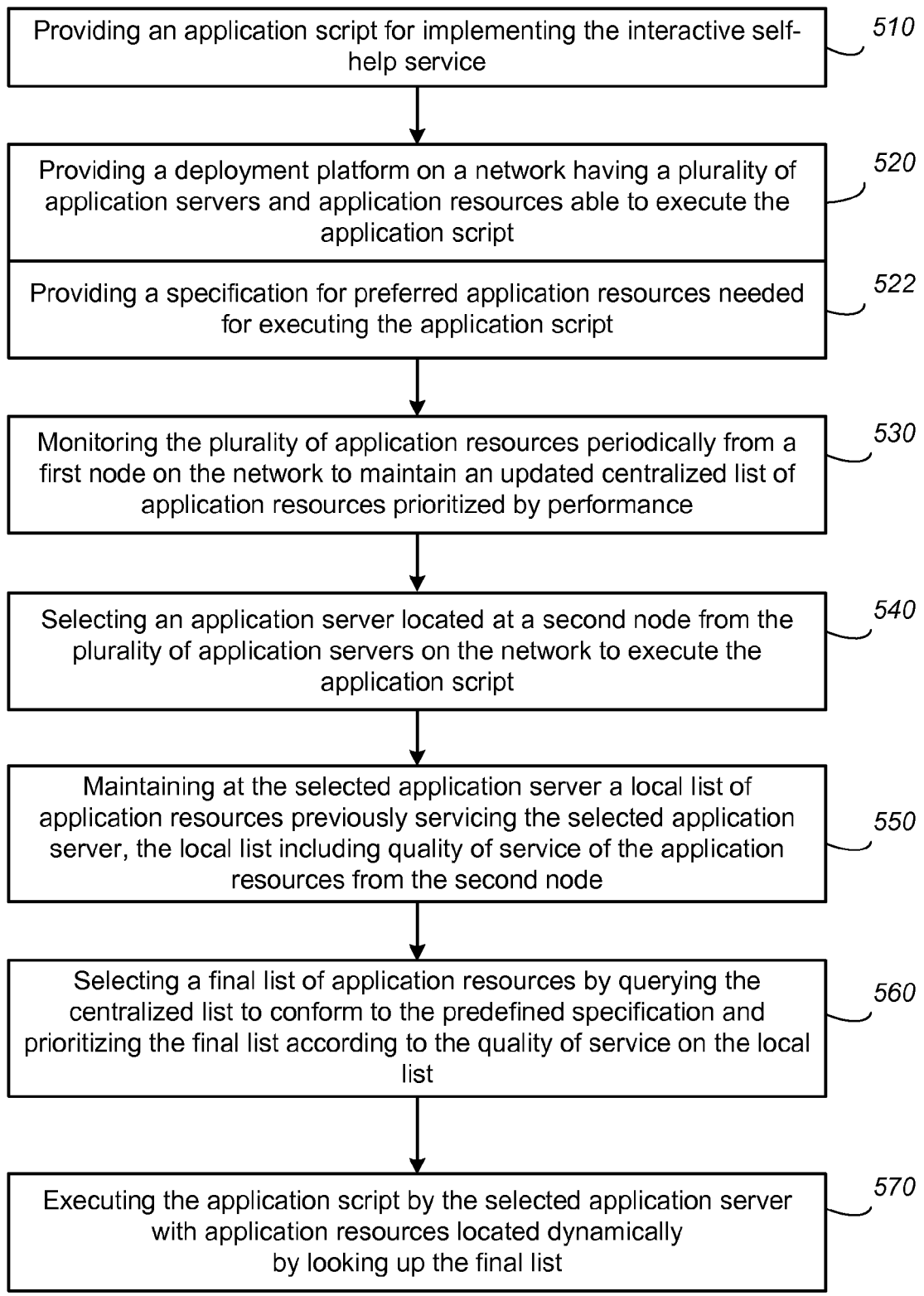
FIG. 8 is a flow diagram illustrating schematically a general embodiment of the invention.

FIG. 8 is a flow diagram illustrating schematically a general embodiment of the invention.

STEP 510: Providing an application script for implementing the interactive self-help service.

STEP 520: Providing a deployment platform on a network having a plurality of application servers and application resources able to execute the application script.

STEP 522: Providing a specification for preferred application resources needed for executing the application script.

STEP 530: Monitoring the plurality of application resources periodically from a first node on the network to maintain an updated centralized list of application resources prioritized by performance.

STEP 540: Selecting an application server located at a second node from the plurality of application servers on the network to execute the application script.

STEP 550: Maintaining at the selected application server a local list of application resources previously servicing the selected application server, the local list including quality of service of the application resources from the second node.

STEP 560: Selecting a final list of application resources by querying the centralized list to conform to the predefined specification and prioritizing the final list according to the quality of service on the local list.

STEP 570: Executing the application script by the selected application server with application resources located dynamically by looking up the final list.

The invention described allows an optimum selection of a resource when a user/customer's application is being executed in a browser. The selection takes into account of predefined user preferences and license limitations, performance considerations, and resource availability. The selection is based on additional resource selection criteria, including central-view/local-view of resource status, calling party, called party, current tenant in a multi-tenant system, and also resource preference. A multi-tenant system has multiple users/customers sharing the same hosting platform. The maintenance of a local blacklist of resources relative to the browser/customer/application based on history provides refined selections of resources. Also, the license limitation is imposed at a peer to peer level, between the browser/customer/application and the resource in question, rather than being enforced by a centralized control. This distributed approach avoids the disadvantage of a single point of failure.

While the invention has been described in the context of a voice client interacting with a voice application such as an IVR. The IVR is a specific type of self help application where a voice client interacts with the application via a voice channel. The invention is equally applicable to multi-channel self-help systems in which other clients such as a text messaging client via a text messaging channel can also interact with the application.

It is claimed:

1. A method of operating an interactive self-help service, comprising:
   providing an application script for implementing the interactive self-help service;
   providing a deployment platform on an IP network having a plurality of application servers and application resources distributed over the IP network able to execute the application script;
   providing a specification for preferred application resources needed for executing the application script;
   monitoring the plurality of application resources periodically for status of each from a first node on the network to maintain an updated centralized list of the application resources prioritized by performance;
   selecting an application server located at a second node from the plurality of application servers on the network to execute the application script;
   maintaining at the selected application server a local list of application resources previously servicing the selected application server, the local list including quality of service of the application resources from the second node;
   selecting a central view list of application resources by querying the centralized list by resource type to conform to a predefined specification and prioritized by performance;
   querying the local list to select a local view list of previously contacted resources prioritized by availability and indicating a degree of success of previous browser attempts for each previously contacted resource; and
   executing the application script by the selected application server with application resources located dynamically from a final prioritized list created based upon the central view list filtered by using the local view list.

2. The method as in claim 1, further comprising: replicating a copy of the centralized list to each of the plurality of application servers.

3. The method as in claim 1, wherein the self-help service is an interactive voice response service.

4. The method as in claim 1, wherein the application resources include media conversion proxy servers.

5. The method as in claim 4, wherein the media conversion proxy servers include at least one of a server that converts text to speech for a specific language and a sever that converts speech to text for a specific language.

6. The method as in claim 1, wherein the local view list differentiates unsuccessful browser attempts by failure types and orders with a degree of failure metric.

7. The method as in claim 1, wherein the specification for preferred application resources needed for executing the application script includes preferred media conversion proxy servers.

8. The method as in claim 1, wherein the specification for preferred application resources needed for executing the application script includes application resources accessible by a specific network segment.

9. The method as in claim 1, wherein the specification for preferred application resources needed for executing the application script includes application resources accessible by a specific network route.

10. The method as in claim 1, wherein the specification for preferred application resources needed for executing the application script includes application resources having a tariff below a predefined limit.

11. The method as in claim 1, wherein a metric for the performance of the application resources includes at least one of working capacity and access time.

12. The method as in claim 1, wherein the application resource is located from the final prioritized list by selecting from the final prioritized list in priority order, and using load balancing if several resources of a given type to be selected are of equal order.

13. The method as in claim 1, wherein a metric for the quality of service of an application resource includes network access rate.

14. The method as in claim 1, wherein a metric for the quality of service of an application resource includes no access due to exhaustion of licenses of use for the application resource.

15. An interactive self-help application system, comprising:
    an application script for implementing the interactive self-help service;
    a deployment platform on a network having a plurality of application servers distributed over the network and application resources able to execute the application script;
    a specification for preferred application resources needed for executing the application script;
    a centralized list of application resources, said centralized list of resources being checked and updated from a first node on the network to maintain a list of application resources prioritized by performance and including resource preference and availability;
    a selected application server located at a second node on the network for executing the application script, said selected application server being selected from the plurality of application servers on the network;
    a local list of application resources maintained at the selected application server, said local list of application resources listing application resources previously servicing the selected application server including quality of service of the application resources from the second node;
    a central view list of application resources obtained by querying the centralized list by resource type to conform to a predefined specification and prioritized by performance;
    a local view list of resources generated by querying the local list to select a list of previously contacted resources prioritized by availability and indicating a degree of success of previous browser attempts for each previously contacted resource; and
    wherein the application script is executed by the selected application server with application resources located dynamically from a final prioritized list created based upon the central view list filtered by using the local view list.

16. The system as in claim 15, further comprising: replicating a copy of the centralized list to each of the plurality of application servers.

17. The system as in claim 15, wherein the self-help service is an interactive voice response service.

18. The system as in claim 15, wherein the application resources include media conversion proxy servers.

19. The system as in claim 18, wherein the media conversion proxy servers include at least one of a server that converts text to speech for a specific language and a server that converts speech to text for a specific language.

20. The system as in claim 18, wherein the local view list differentiates unsuccessful browser attempts by failure type and is ordered with a degree of failure metric.

21. The system as in claim 15, wherein the specification for preferred application resources needed for executing the application script includes preferred media conversion proxy servers.

22. The system as in claim 15, wherein the specification for preferred application resources needed for executing the application script includes application resources accessible by a specific network segment.

23. The system as in claim 15, wherein the specification for preferred application resources needed for executing the application script includes application resources accessible by a specific network route.

24. The system as in claim 15, wherein the specification for preferred application resources needed for executing the application script includes application resources having a tariff below a predefined limit.

25. The system as in claim 15, wherein a metric for the performance of the application resources includes at least one of working capacity and access time.

26. The system as in claim 15, wherein the application resource is located from the final prioritized list by selecting from the final prioritized list in priority order and using load balancing if several resources of a given type to be selected are of equal order.

27. The system as in claim 15, wherein a metric for the quality of service of an application resource includes network access rate.

28. The system as in claim 15, wherein a metric for the quality of service of an application resource includes no access due to exhaustion of licenses of use for the application resource.

* * * * *